United States Patent [19]

Simmons

[11] Patent Number: 4,961,312

[45] Date of Patent: Oct. 9, 1990

[54] METHOD FOR CONTROLLING AUGMENTOR LINER COOLANT FLOW PRESSURE IN A MIXED FLOW, VARIABLE CYCLE GAS TURBINE ENGINE

[75] Inventor: John R. Simmons, Montgomery, Ohio

[73] Assignee: General Electric Company, Cincinnati, Ohio

[21] Appl. No.: 242,098

[22] Filed: Sep. 9, 1988

Related U.S. Application Data

[60] Division of Ser. No. 57,642, Jun. 8, 1987, Pat. No. 4,813,229, which is a continuation of Ser. No. 708,181, Mar. 4, 1985, abandoned.

[51] Int. Cl.$^5$ .............................. F02K 3/075; F02K 3/10
[52] U.S. Cl. ............................................. 60/204
[58] Field of Search ..................... 60/204, 226.3, 233, 60/241, 261, 39.29

[56] References Cited

U.S. PATENT DOCUMENTS

| | | | |
|---|---|---|---|
| 3,344,606 | 10/1967 | Abernathy | 60/261 |
| 3,866,417 | 2/1975 | Velegol | 60/261 |
| 4,010,608 | 3/1977 | Simmons | 60/261 |
| 4,072,008 | 2/1978 | Kenworthy et al. | 60/261 |
| 4,285,194 | 8/1981 | Nash | 60/261 |
| 4,813,229 | 3/1989 | Simmons | 60/204 |

Primary Examiner—Louis J. Casaregola
Attorney, Agent, or Firm—Jerome C. Squillaro; Steven J. Rosen

[57] ABSTRACT

The present invention dicloses means and method for modulating the bypass flow in a mixed flow, variable cycle gas turbine engine. The engine includes means to vary the bypass flow and includes an augmentor and liner with coolant supplied by a portion of the bypass flow. The bypass flow pressure is modulated by sensing the pressure of the liner coolant and the pressure in the augmentor and varying the flow pressure as a function of $P_1$, $P_2$, or both.

8 Claims, 1 Drawing Sheet

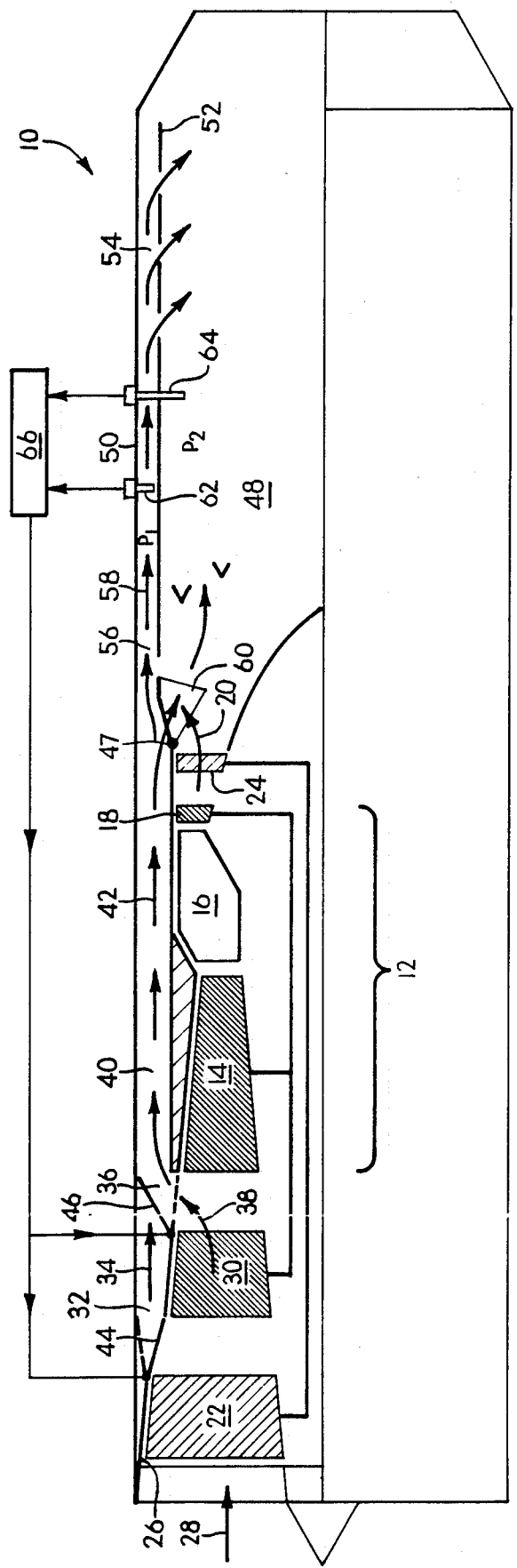

METHOD FOR CONTROLLING AUGMENTOR LINER COOLANT FLOW PRESSURE IN A MIXED FLOW, VARIABLE CYCLE GAS TURBINE ENGINE

This is a division of application Ser. No. 057,642, filed June 8, 1987 (U.S. Pat. No. 4,813,229) which is a continuation of Ser. No. 708,181, filed Mar. 4, 1985 (abandoned).

This invention relates generally to augmented gas turbine engines and, more particularly, to a method for controlling augmentor liner coolant flow pressure.

BACKGROUND OF THE INVENTION

Gas turbine engines generally comprise a compressor for compressing air flowing through the engine, a combustor in which fuel is mixed with the compressed air and ignited to form a high energy gas stream, and a turbine for driving the compressor. One type of gas turbine engine for an aircraft is the turojet in which thrust is provided by the high velocity gas stream exiting the turbine.

A second type of aircraft gas turbine engine is the turbofan in which a fan is mounted forward of the compressor and is driven by a second turbine or power turbine mounted downstream of the first turbine. The fan produces a flow of pressurized air which is split into two portions. The first portion enters an outer bypass duct for bypassing the core engine and the second portion enters the compressor of the core engine. One advantage of the turbofan engine over the turbojet is its ability to move a larger mass of air and thereby increase the thrust output of the engine.

Another feature which may be utilized to increase the thrust output of a gas turbine engine is an augmentor. In an augmented gas turbine engine, an exhaust duct is provided downstream of the turbine(s). Additional fuel is injected into the exhaust duct and is ignited to increase the energy of the gas stream. The gas stream is ejected through an exhaust nozzle to increase the thrust output of the engine.

One type of engine which combines features of the turbofan and augmented engine is a mixed-flow engine where fan airflow is mixed with the core engine gas stream after the turbine but forward of the augmentor. A characteristic of turbofan engines, especially high bypass turbofan engines, is relatively low specific fuel consumption at subsonic speeds. A characteristic of turbojet and relatively low bypass turbofan engines is relatively high specific thrust characteristics at supersonic speeds.

In order to satisfy the need for aircraft which must efficiently operate over a wide range of subsonic and supersonic speeds, so-called variable cycle engines have been developed. Such variable cycle engines are characterized by the capacity to change the bypass ratio of the engine during operation. For example. U.S. Pat. Nos. 4,010,608—Simmons and 4,175,384—Wagenknecht et al disclose variable cycle engines. Each variable cycle engine disclosed includes an outer bypass duct and a variable area bypass injector for modulating the flow through the bypass duct thereby varying the engine cycle.

The augmentor in such variable cycle engines is normally located within the exhaust duct of the engine. In order to protect the exhaust duct from the extremely high temperatures associated with the gas flow within the augmentor, a cooling liner bay be positioned within the duct so as to form a cooling plenum therebetween. A portion of the bypass flow may then be diverted into this plenum for cooling of the same.

A fundamental problem in the design of an augmentor liner is the pressure differential that may exist between the coolant flow within the plenum and the gas flow inside the liner. The problem becomes particularly acute when the pressure inside the liner suddenly drops. For example, a sudden decrease in the fuel flow to the combustor (throttle chop) will slow the core engine down and reduce the pressure within the augmentor faster than the pressure of the bypass air. Therefore, the design of the liner must provide some means for preventing the inward collapse of the liner.

In the past, various techniques have been proposed to overcome this problem. For example, adequate support such as hangers or couplings may be provided to retain the liner within the duct. However, such solutions add additional complexity and weight and increase the manufacturing cost of the liner. Another means of control is disclosed in U.S. Pat. No. 3,866,417, Velegol, wherein the plenum is divided into a number of individual chambers with flow into each chamber being regulated by flanges which restrict the airflow and regulate the pressure. This system is effective but requires extra structural members to achieve the result. Another solution to the problem is disclosed in U.S. Pat. No. 4,072,008, Kenworthy et al, in which a valve is used to regulate airflow to the augmentor liner. Kenworthy et al discloses an effective means for regulating pressure in the plenum. However, both Velegol and Kenworthy et al require some additional structure to the liner system which results in an increase in cost.

OBJECTS OF THE INVENTION

It is an object of the present invention to provide a new and improved method of controlling augmentor liner coolant flow pressure in a gas turbine engine.

It is another object of the present invention to provide an inexpensive and lightweight means for controlling augmentor liner coolant flow pressure in a gas turbine engine.

SUMMARY OF THE INVENTION

One form of the present invention is a method for modulating the bypass flow pressure in a mixed flow, variable cycle gas turbine engine. The engine is the type having a bypass flow and means to vary the bypass flow pressure, and having an augmentor and liner with coolant supplied by a portion of the bypass flow. The method comprises the steps of sensing the pressure $P_1$ of the coolant and the pressure $P_2$ in the augmentor, and varying the bypass flow pressure as a function of $P_1$, $P_2$, or both.

BRIEF DESCRIPTION OF THE DRAWING

The FIGURE is a schematic, cross-sectional view of a mixed flow, variable cycle gas turbine engine incorporating the present invention.

DETAILED DESCRIPTION OF THE INVENTION

The FIGURE shows a mixed flow, variable cycle gas turbine engine 10. Engine 10 has a core engine 12 which includes a compressor 14 for compressing air flowing therethrough, a combustor 16 where fuel is mixed with the air to form a high energy gas stream, and a turbine 18 which extract energy from the gas stream for driving compressor 14. Core engine 12 generates a gas flow 20.

Engine 10 further includes a front fan 22 driven by a second turbine 24 located aft of first turbine 18. Fan 22 is located within an inlet 26 and is effective for pressurizing air 28 entering inlet 26. An aft fan 30 is located downstream of front fan 22. Aft fan 30 is driven by turbine 18. However, it will be clear that the invention is not limited to this configuration and may be driven by second turbine 24 or third turbine (not shown). Aft fan 30 further pressurizes air flowing therethrough.

A bypass duct 40 directs bypass flow 42 around core engine 12. Bypass duct 40 includes a first bypass duct inlet 32 which directs a first airflow 34 around aft fan 30. A second bypass duct inlet 36 directs a second airflow 38 from aft fan 30 into bypass duct 40. In this manner, second airflow 38 is mixed with first airflow 34 thereby forming a bypass flow 42.

Varying means for varying the bypass flow pressure in bypass duct 40 are shown at 44 and 46. According to one form of the present invention, the varying means includes a diverter valve at 46 such as disclosed in U.S. Pat. No. 4,068,471—Simmons. According to another form of the invention, the varying means may include a variable area bypass injector including a double-bypass selector valve at 44 and a static pressure valve at 46 such as disclosed in U.S. Pat. No. 4,175,384—Wagenknecht et al. According to yet another form of the invention, the varying means may further include a variable area bypass injector at 47 (a rear VABI) which effectively reduces the area of bypass duct 40.

Other varying means will occur to those skilled in the art and are within the scope of the present invention. The characteristics of such varying means are that first bypass duct inlet 32 and second bypass duct inlet 36 may be fully open creating a turbofan mode of operation, and first bypass duct inlet 32 or second bypass duct inlet 36 may be fully closed while the other is fully open creating a lower bypass turbofan mode approaching a pure turbojet cycle. Furthermore, the varying means may be capable of being positioned in an intermediate position to allow for a bypass flow 42 made up of flows 34 and 38. Accordingly, a feature of the present invention is that the areas of first bypass duct inlet 32 and second bypass duct inlet 36 may be changed. A further feature of the varying means is that the valve at 46 may be configured so that by varying the area of second bypass duct inlet 36 an abrupt change in the cross-sectional area of second bypass duct inlet 36 will be created for airflow 38 passing therethrough. In this manner, a pressure dump loss or pressure drop will occur for airflow 38 passing therethrough. In the event that a rear VABI is used, it may be opened as airflow 38 undergoes a dump loss so that the pressure of bypass flow is reduced while the mass flow remains generally constant.

Located aft of core engine 12 is an augmentor 48 surrounded by an exhaust duct 50. A cooling liner 52 is positioned within duct 50 so as to form a cooling plenum 54 therebetween. Receiving means 56 for receiving a portion 58 of bypass flow 42 into plenum 54 is located at the forward end of liner 52. Mixing means 60 for mixing bypass flow 42 with gas flow 20 is located aft of core engine 12 and forward of augmentor 48. According to one form of the present invention, the mixer is of the variable geometry type as disclosed in U.S. Pat. No. 4,069,661—D. J. Rundell et al.

First sensing means 62 senses the pressure $P_1$ in plenum 54. For example, sensing means 62 may be a pressure transducer or other means well-known in the art. Similarly, second sensing means 64 senses the pressure $P_2$ in the augmentor 48. A control system 66 will receive pressure signals $P_1$ and $P_2$ and send a signal to the varying means to actuate valve at 46 and/or 44. If $P_1$ exceeds $P_2$ by a predetermined value, the valve at 46 may be moved towards a closed position. In this manner, airflow 38 from second bypass duct inlet 36 to bypass duct 40 will undergo a pressure drop. This pressure drop will reduce $P_1$ relative to $P_2$ thereby reducing the radially inwardly directed forces on liner 52.

It is also possible to develop a control system which monitors only $P_1$ or $P_2$. For example, control system 66 could respond to maximum values of $P_1$ or sudden changes in the value of $P_2$. It should be clear that control system 66 may also control the valve at 44 or the valves at both 44 and 46 in order to achieve control of pressure $P_1$ through modulation of the bypass flow pressure in bypass duct 40.

Another feature of the present invention is that the dump loss created in the forward bypass duct may result in performance improvement. Gross thrust is the product of mass flow and the flow velocity. In engines such as shown in the figure, airflow is limited by a maximum mach number through mixer 60. The dump loss created by valve 46 results in a decrease of total pressure of bypass flow 42. Since total pressure is a function of mach number, this also reduces mach number through mixer 60. Accordingly, the spedd of engine 10 may be raised thereby increasing the mach number of the bypass flow through mixer 60. The higher speed of engine 10 increases mass flow through the engine thereby increasing thrust.

It will be clear to those skilled in the art that the present invention is not limited to the specific embodiments described and illustrated herein. Rather, it applies equally to any variable cycle engine with means to vary the bypass flow in that engine.

It will be understood that the dimensions and proportional and structural relationships shown in the drawing are by way of example only, and these illustrations are not to be taken as the actual dimensions or proportional structural relationships used in the variable cycle engine of the present invention.

Numerous modifications, variations, and full and partial equivalents can now be undertaken without departing from the invention as limited only by the spirit and scope of the appended claims.

What is desired to be secured by Letters Patent of the United States is the following.

What is claimed is:

1. In a mixed flow, variable cycle gas turbine engine having a bypass flow in a bypass duct and means to vary the bypass flow pressure and having an augmentor and liner with coolant supplied by a portion of said bypass flow and an exahust duct surrounding said augmentor and liner which is positioned within said exhaust duct so as to form a cooling plenum therebetween, a method for modulating the bypass flow pressure comprising:

sensing at least a first control pressure $P_1$ in said plenum and varying said bypass flow pressure in said bypass duct as a function of at least said first control pressure $P_1$.

2. A method, as recited in claim 1, further comprising: sensing a second control pressure $P_2$ in said augmentor; and varying said bypass flow pressure in said bypass duct as a function of said first control pressure $P_1$ and said second control pressure $P_2$.

3. A method, as recited in claim 1, further comprising:
sensing a second control pressure $P_2$ in said augmentor; and
varying said bypass flow pressure in said bypass duct as a function of said first control pressure $P_1$ minus said second control pressure $P_2$.

4. In a gas turbine engine having a core engine for generating a gas flow, a front fan for pressurizing air, an aft fan for further pressurizing air discharged from the front fan, a core bypass duct including a first bypass duct inlet for directing a first airflow around the aft fan, a second bypasss duct inlet for directing a second airflow from the aft fan into said core bypass duct thereby forming a bypass flow with said first airflow, means for varying said bypass flow, an augmentor aft of said core engine, an exhaust duct surrounding said augmentor, a cooling liner positioned within said duct so as to form a cooling plenum therebetween, means for receiving a portion of said bypass flow into said plenum, and means for mixing said bypass flow with said gas flow, a method for modulating the bypass flow pressure comprising:
sensing a first control pressure $P_1$ in the cooling plenum; and
varying the area of said second bypass duct inlet as a function of the first control pressure $P_1$.

5. A method, as recited in claim 4, further comprising:
sensing a second control presure $P_2$ in the augmentor and further varying the area of said second bypass duct inlet as a function of the first pressure $P_1$ in said plenum minus the second pressure $P_2$ in said augmentor.

6. In a gas turbine engine having a core engine for generating a gas flow, a front fan for pressurizing air, an aft fan for further pressurizing air discharged from the front fan, a core bypass duct including a first bypass duct inlet for directing a first airflow around the aft fan, a second bypass duct inlet for directing a second airflow from the aft fan into said core bypass duct thereby forming a bypass flow with the first airflow, means for varying the bypass flow, an augmentor aft of the core engine, an exhaust duct surrounding the augmentor, a cooling liner positioned within the duct so as to form a cooling plenum therebetween, means for receiving a portion of the bypass flow into the plenum, and means for mixing the bypass flow with the gas flow, a method for modulating the bypass flow pressure comprising:
sensing a first control pressure $P_1$ in the cooling plenum; and
varying the area of the first bypass duct inlet as a function of at least the first control pressure $P_1$.

7. A method, as recited in claim 6, further comprising:
sensing a second control pressure $P_2$ in the augmentor and further varying the area of the second bypass duct inlet as a function of the difference between the first pressure $P_1$ in the plenum and the second pressure $P_2$ in the augmentor.

8. In a gas turbine engine having a core engine for generating a gas flow, a front fan for pressurizing air, an aft fan for further pressurizing air discharged from the front fan, a core bypass duct including a first bypass duct inlet for directing a first airflow around the aft fan, a second bypass duct inlet for directing a second airflow from the aft fan into said core bypass duct thereby forming a bypass flow, an augmentor aft of the core engine, an exhaust duct surrounding the augmentor, a cooling liner positioned within the duct so as to form a cooling plenum therebetween, means for receiving a portion of the bypass flow into the plenum, and means for mixing the bypass flow with the gas flow, a method for modulating the bypass flow pressure comprising:
sensing a first control pressure $P_1$ in the cooling plenum;
sensing a second control pressure $P_2$ in the augmentor; and
varying the area of said second bypass duct inlet and said first bypass duct inlet as a function of the first control pressure $P_1$ in the cooling plenum and the second control pressure $P_2$ in the augmentor.

* * * * *